March 26, 1935. C. M. HESSON 1,995,306

LABELING MACHINE

Filed Nov. 12, 1932 13 Sheets-Sheet 1

Inventor

Charles M. Hesson,

By Milans & Milans
Attorneys

March 26, 1935.   C. M. HESSON   1,995,306
LABELING MACHINE
Filed Nov. 12, 1932   13 Sheets-Sheet 2
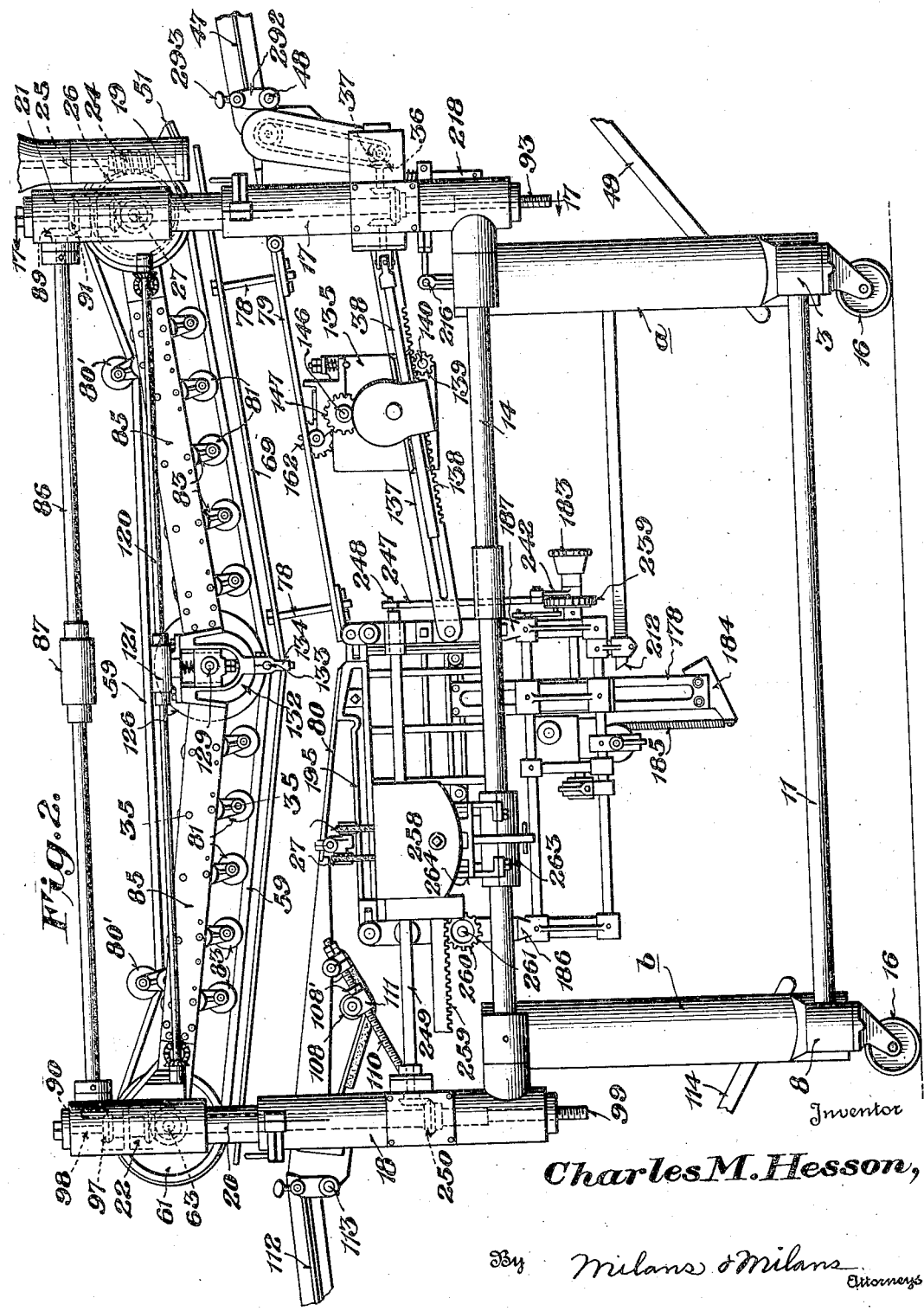
Inventor
Charles M. Hesson,
By Milans & Milans
Attorneys March 26, 1935.  C. M. HESSON  1,995,306
LABELING MACHINE
Filed Nov. 12, 1932  13 Sheets-Sheet 3
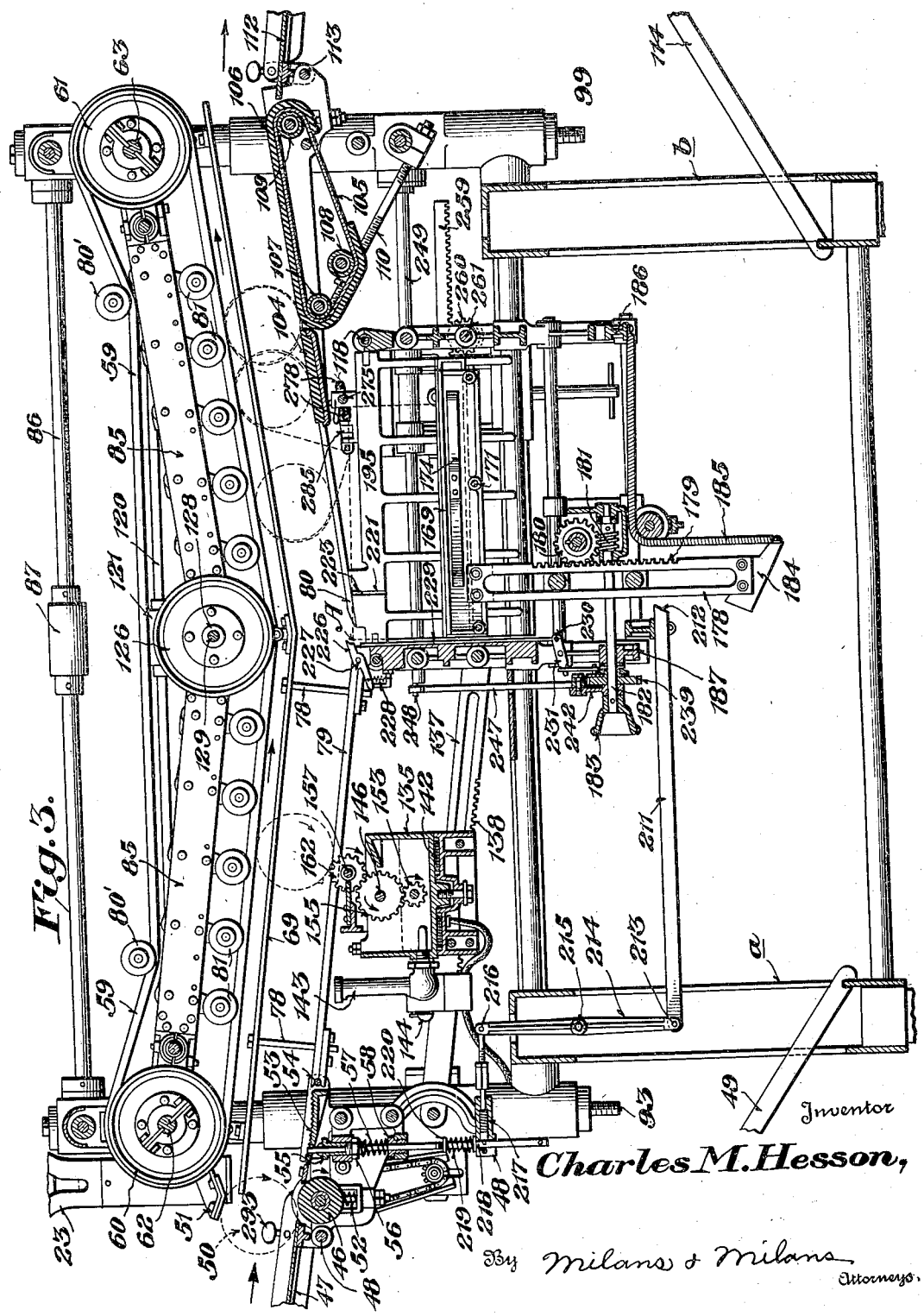
Charles M. Hesson,
By Milans & Milans
Attorneys

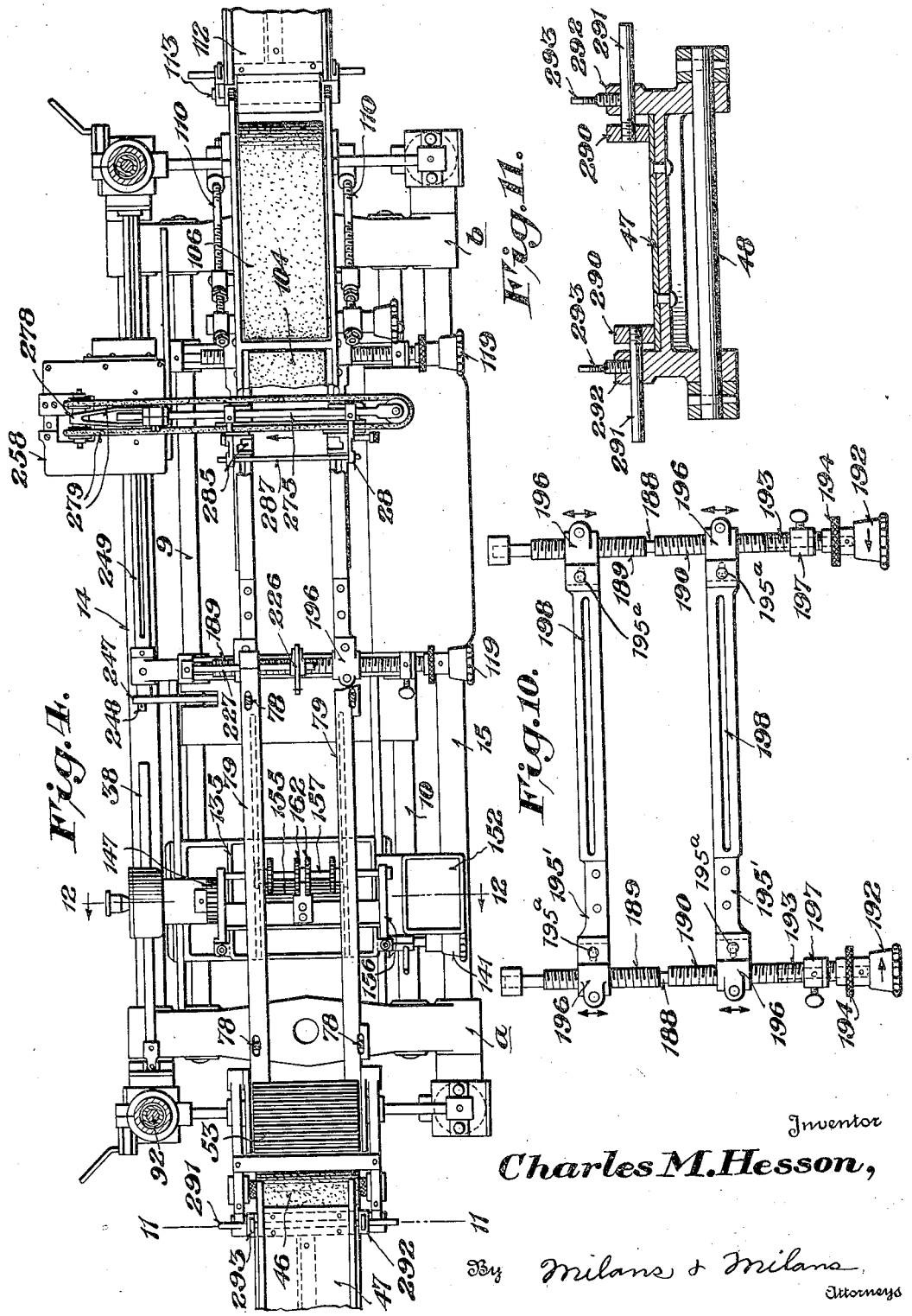

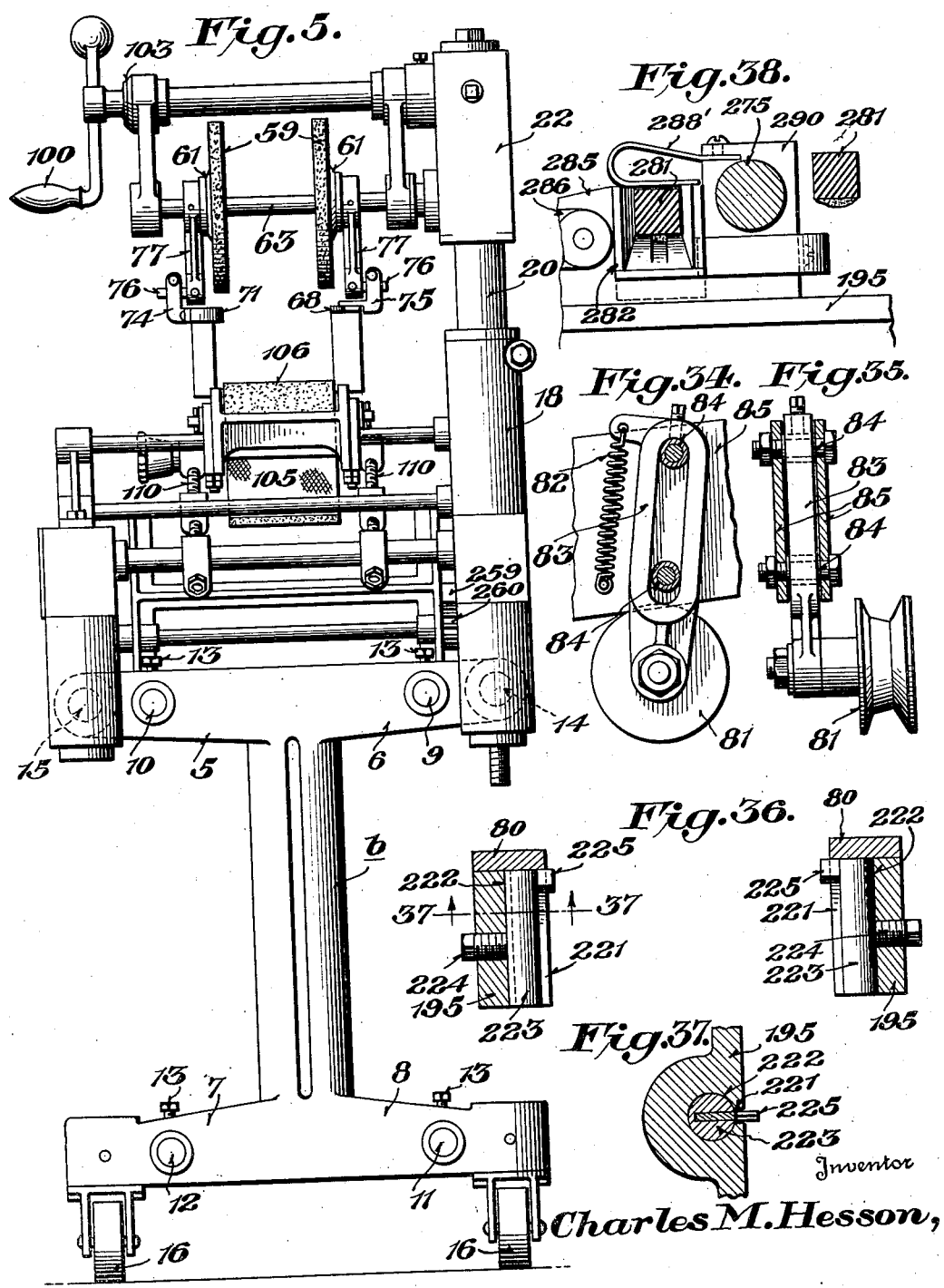

March 26, 1935.  C. M. HESSON  1,995,306
LABELING MACHINE
Filed Nov. 12, 1932  13 Sheets-Sheet 6
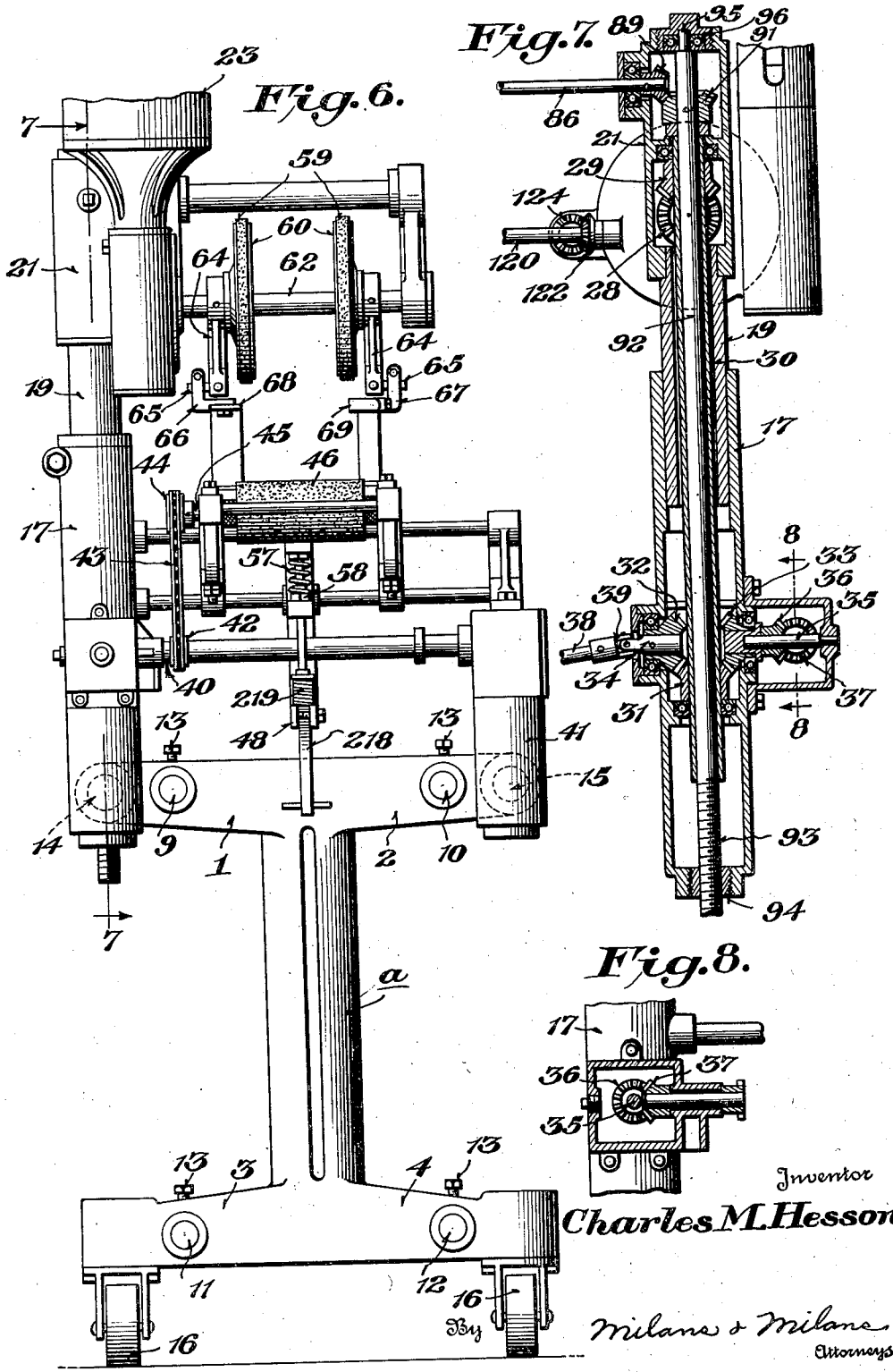

March 26, 1935.　　　　C. M. HESSON　　　1,995,306
LABELING MACHINE
Filed Nov. 12, 1932　　　13 Sheets-Sheet 7
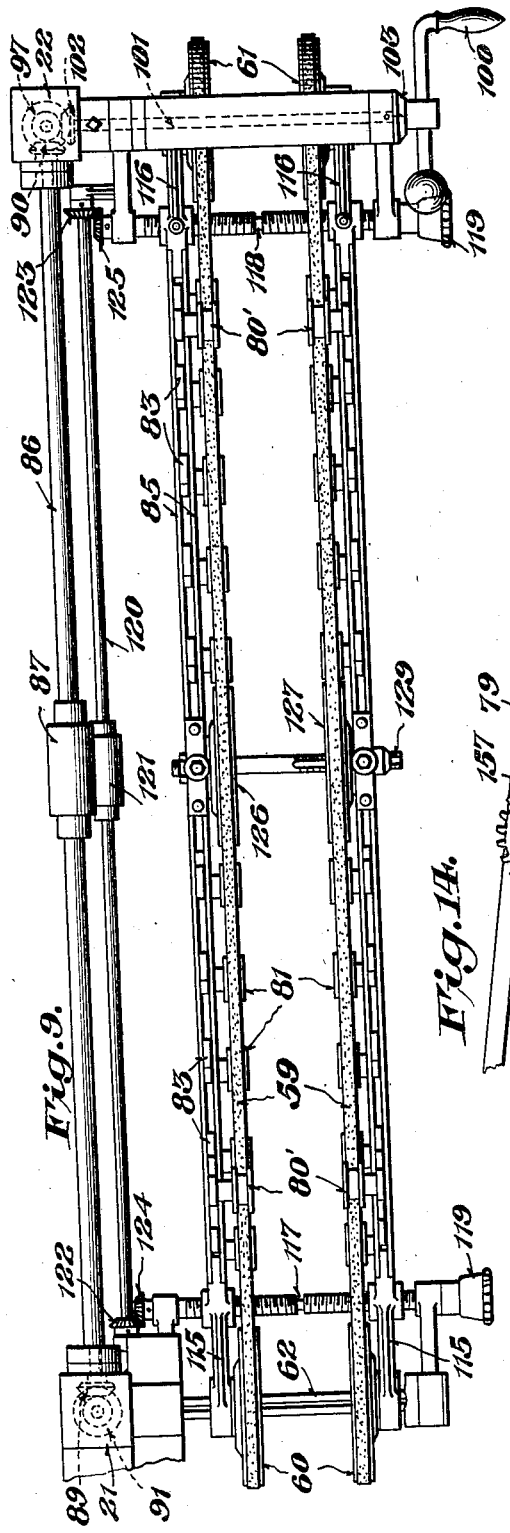
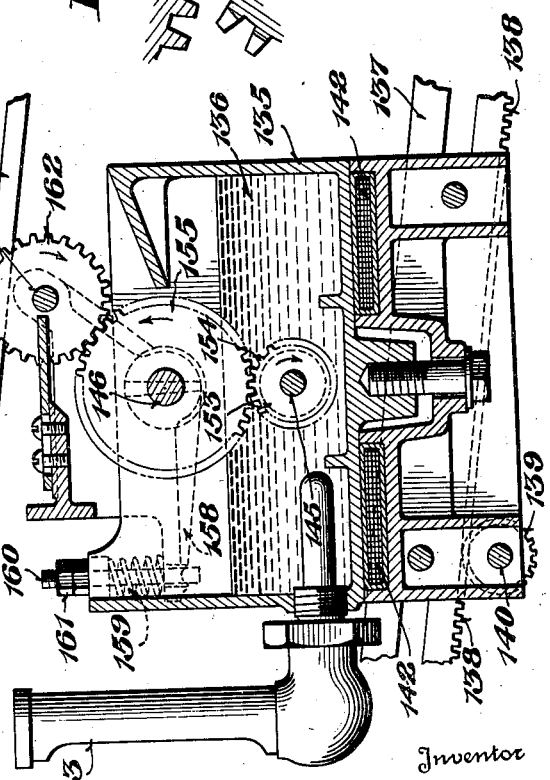
Inventor
Charles M. Hesson,
By Milans & Milans
Attorneys

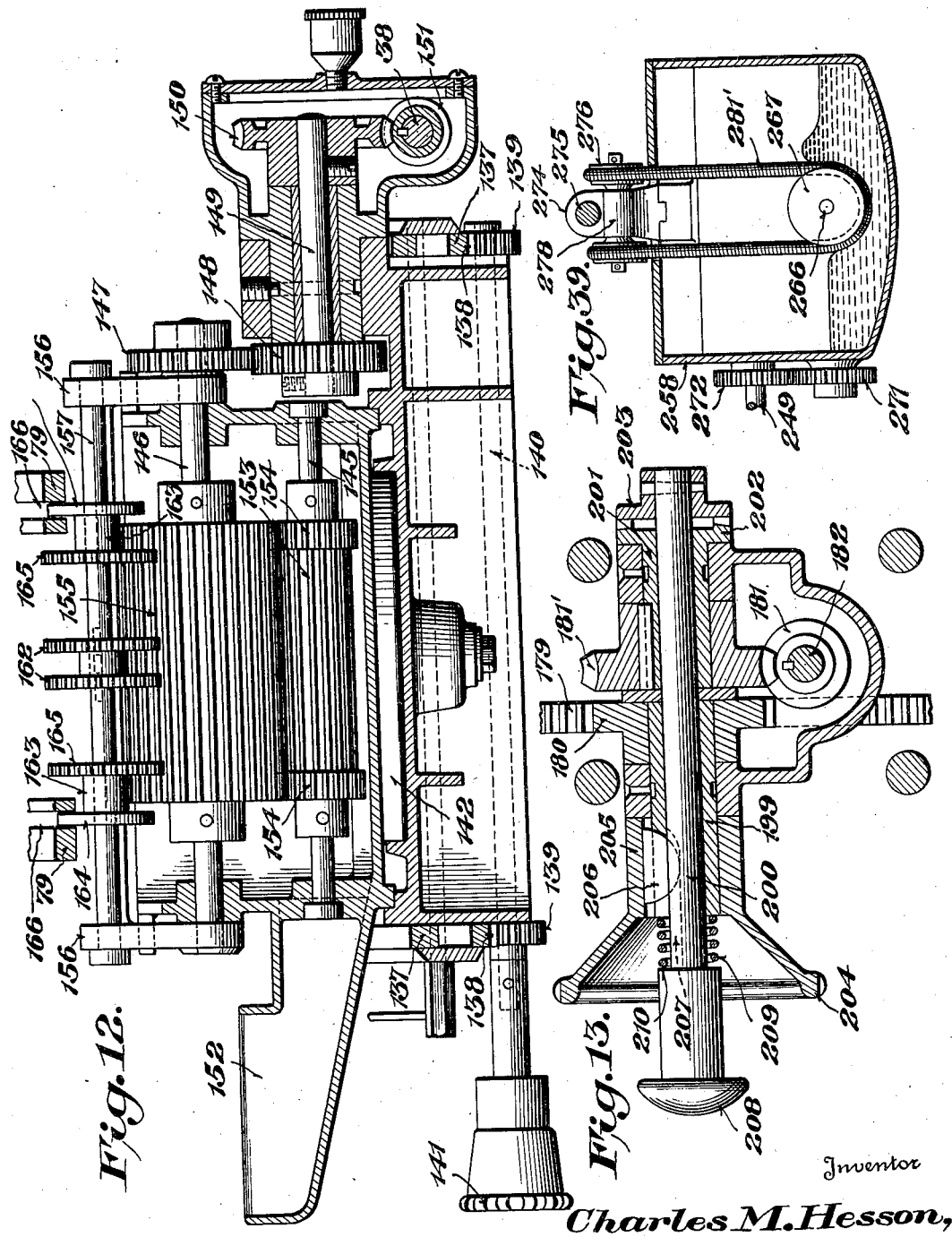

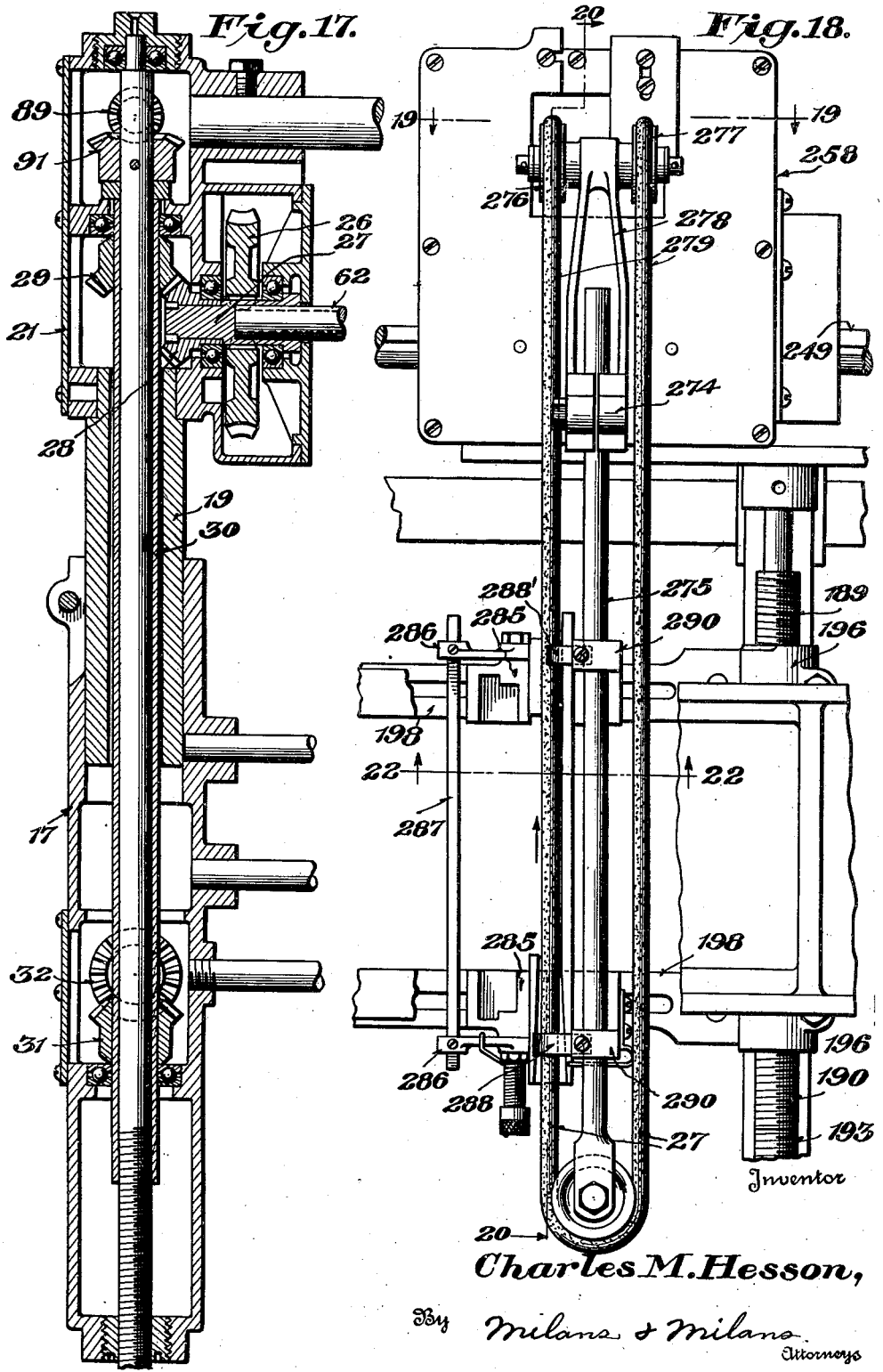

March 26, 1935. C. M. HESSON 1,995,306
LABELING MACHINE
Filed Nov. 12, 1932  13 Sheets-Sheet 10
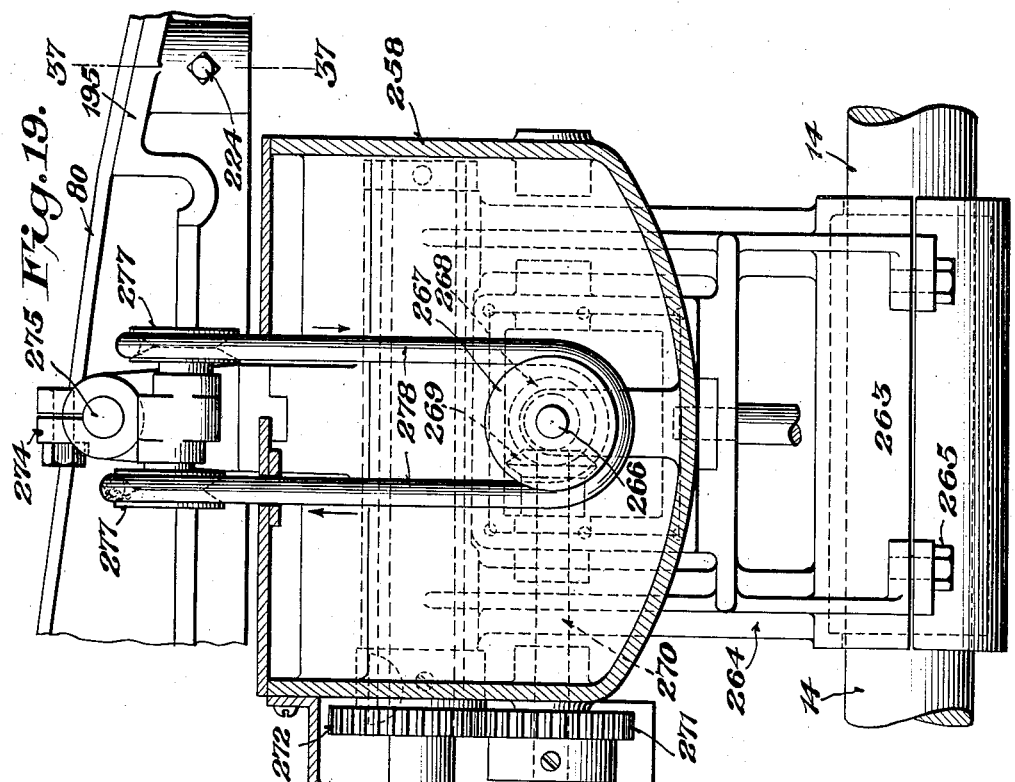
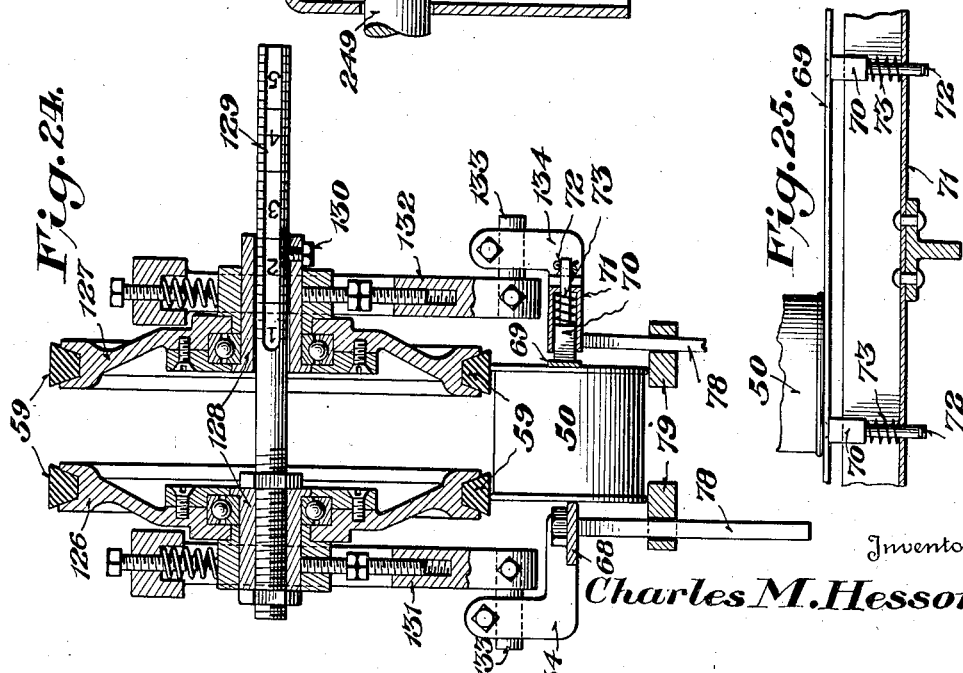
Inventor
Charles M. Hesson,
By Milans & Milans
Attorneys March 26, 1935. C. M. HESSON 1,995,306
LABELING MACHINE
Filed Nov. 12, 1932 13 Sheets-Sheet 11
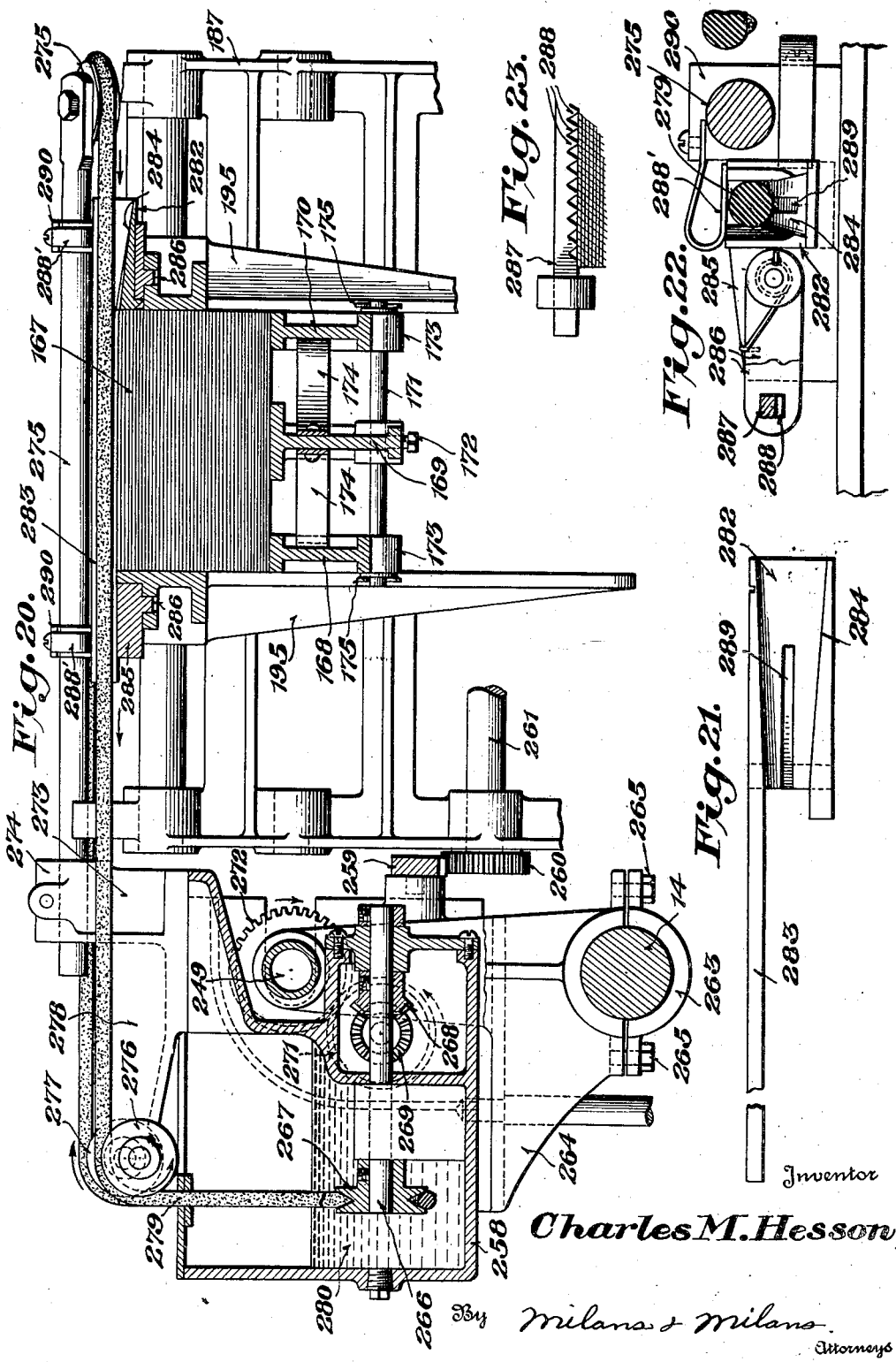
Inventor
Charles M. Hesson,
By Milans & Milans
Attorneys

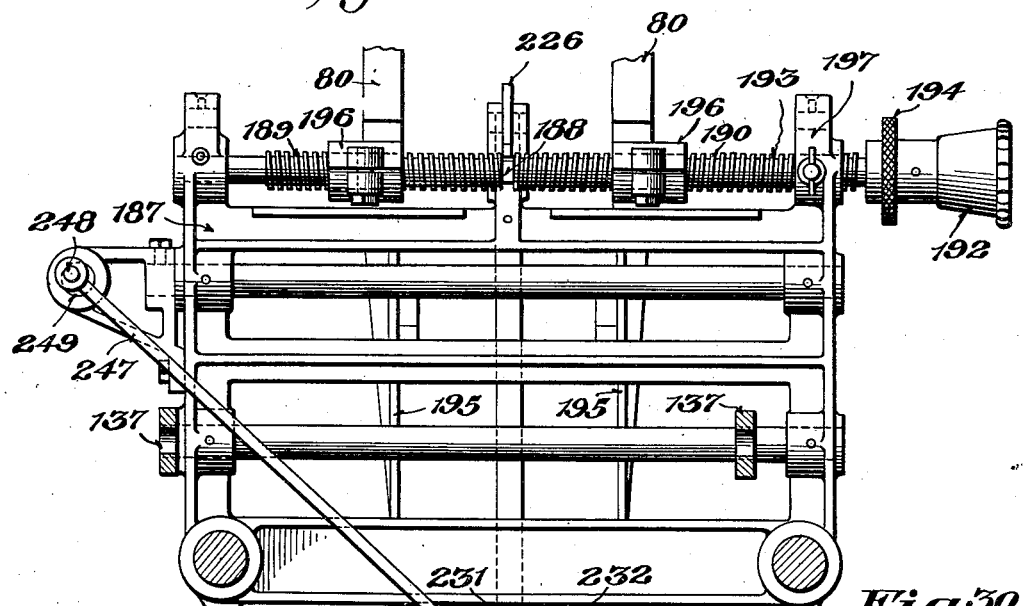
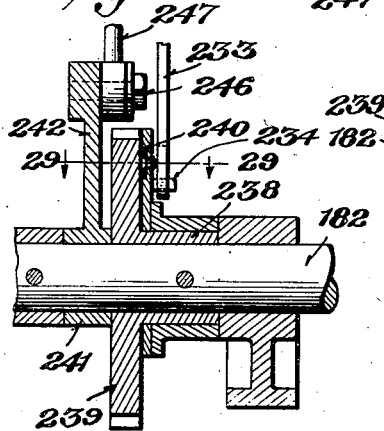
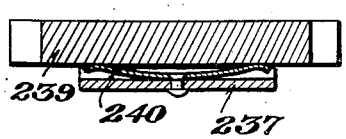
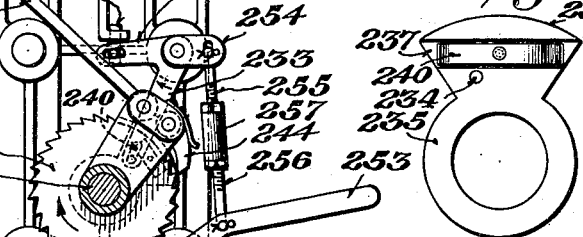
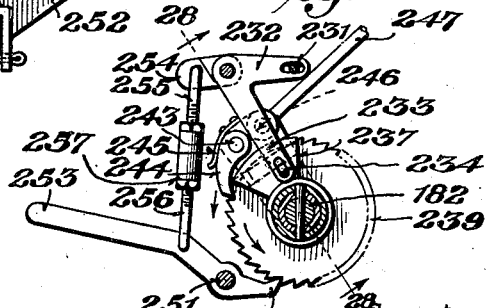

March 26, 1935. C. M. HESSON 1,995,306
LABELING MACHINE
Filed Nov. 12, 1932 13 Sheets-Sheet 13
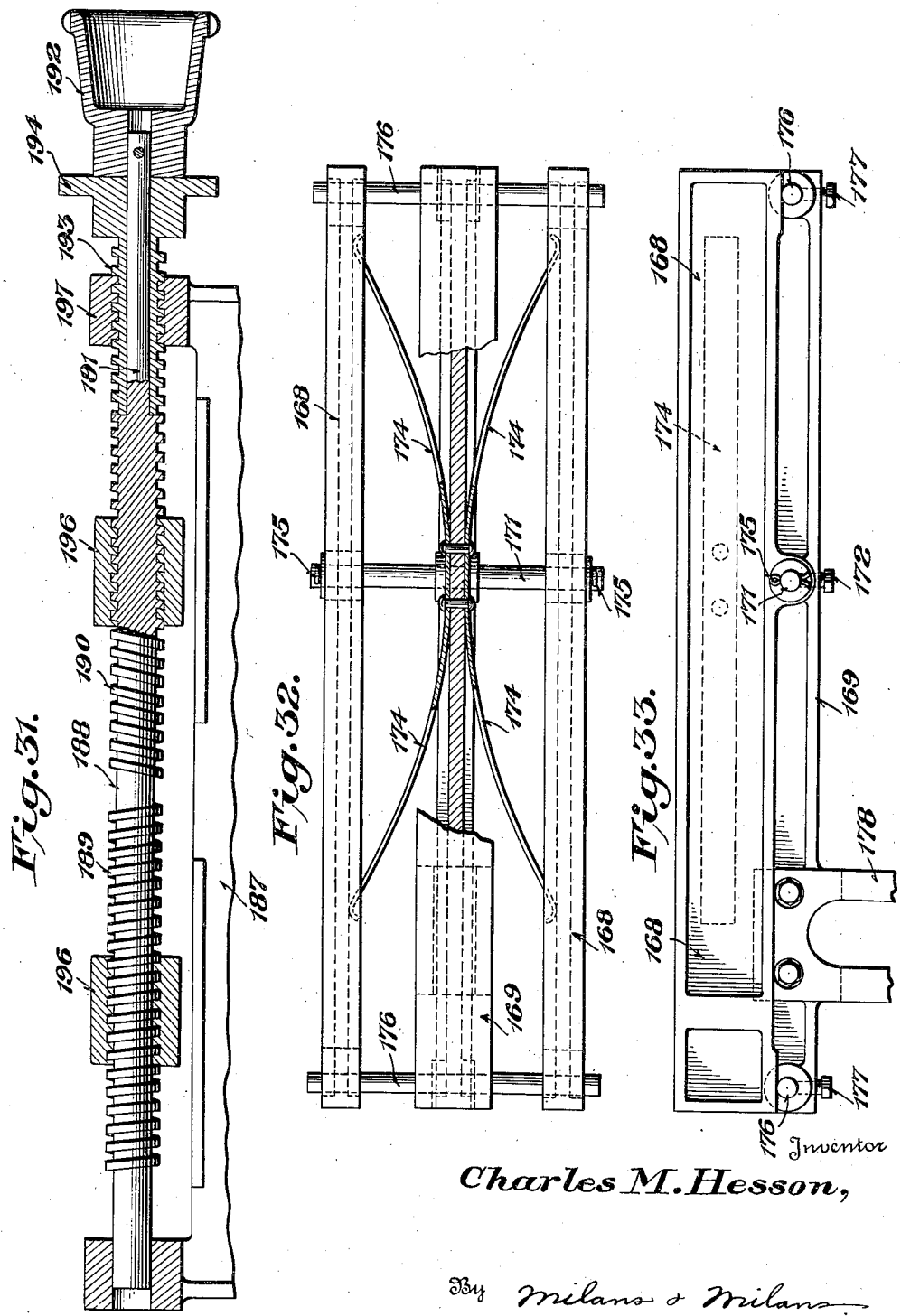
Inventor
Charles M. Hesson,
By Milans & Milans
Attorneys Patented Mar. 26, 1935

1,995,306

UNITED STATES PATENT OFFICE 1,995,306

LABELING MACHINE

Charles M. Hesson, Hanover, Pa., assignor to Hanover Machine Corporation, Hanover, Pa., a corporation of Pennsylvania Application November 12, 1932, Serial No. 642,428

32 Claims. (Cl. 216—57)

My invention relates to new and useful improvements in labeling machines and while primarily intended for applying labels to cans may equally as well be used for applying labels to other cylindrical containers.

The principal object of the present invention resides in the provision of a machine of the character described which is adjustable for different size labels and for different size containers to which the labels are to be applied.

Another object of the invention consists in the provision of novel means for supporting the containers and for feeding them through the machine, means being provided for applying adhesive to each container as it is fed through the machine, this adhesive applied to the container engaging and pulling a label from a stack of such labels, the label being wound around the container during the passage of the container through the machine, a line of adhesive being applied to the label for sealing the overlapped ends thereof.

A further object of the invention resides in the provision of means for delivering the containers from the machine at such a time during the movement thereof that there will be no possibility of wrinkling the label, there always being a tight contact or adhesion of the label with the container.

As a further object of the invention I provide novel means for supporting a stack of labels as well as means for both manually and automatically feeding the labels towards the track over which the cans pass, the labels thus being in position at all times so that the uppermost label in the stack may be engaged and removed by a container as it passes through the machine.

Another object of the invention resides in the provision of novel means for stopping the passage of the containers through the machine when the labels have become exhausted from the stack and at the time that it is necessary to replenish the stack.

As an additional object of the invention I provide a novel form of mechanism for applying an adhesive to the label, said mechanism being formed and arranged to require a minimum amount of space.

With the above and other objects in view, which will appear as the description proceeds, my invention consists in the novel details of construction and arrangement of parts, described in the following specification and illustrated in the accompanying drawings, and while I have illustrated and described the preferred embodiments of the invention, as they now appear to me, it will be understood that such changes may be made as will fall within the scope of the appended claims.

In the drawings:—

Fig. 2 is a side elevation of the opposite side of the machine.

Fig. 3 is a longitudinal vertical section through the machine with parts shown in side elevation.

Fig. 4 is a horizontal section on the line 4—4 of Fig. 1 looking in the direction of the arrows.

Fig. 5 is an end view looking from the right hand end of the machine in the position shown in Figs. 1 and 3.

Fig. 6 is an end view looking at the opposite end of the machine.

Fig. 7 is a fragmental vertical section on the line 7—7 of Fig. 6 looking in the direction of the arrows.

Fig. 8 is a section on the line 8—8 of Fig. 7 looking in the direction of the arrows.

Fig. 9 is a top plan with parts removed.

Fig. 10 is a fragmental detail showing in top plan the supporting members for a section of the track over which the containers pass and acting as guides for the labels and as a support for a portion of the member which applies the adhesive to the label.

Fig. 11 is a transverse section on the line 11—11 of Fig. 4.

Fig. 12 is a transverse vertical section on the line 12—12 of Fig. 4 looking in the direction of the arrows.

Fig. 13 is a fragmental detail showing a section on the line 13—13 of Fig. 1.

Fig. 14 is an enlarged detail, partly in section and partly in elevation, of the receptacle for containing the adhesive to be applied to the container and the mechanism for applying said adhesive to the container.

Fig. 15 is a fragmental detail showing a section on the line 15—15 of Fig. 14.

Fig. 16 is a fragmental detail showing in side elevation the means for raising and lowering the height of the machine.

Fig. 17 is a section on the line 17—17 of Fig. 2 looking in the direction of the arrows.

Fig. 18 is a fragmental top plan of the mechanism for applying the line of adhesive to the label.

Fig. 19 is a transverse vertical section on the line 19—19 of Fig. 18 looking in the direction of the arrows.

Fig. 20 is a section on the line 20—20 of Fig. 18 looking in the direction of the arrows.

Fig. 21 is a top plan of the guide for the belt which applies the adhesive to the label.

Fig. 22 is a section on the line 22—22 of Fig. 18 looking in the direction of the arrows.

Fig. 23 is a fragmental detail of the bar for engaging and holding the labels.

Fig. 24 is a section on the line 24—24 of Fig. 1 looking in the direction of the arrows.

Fig. 25 is a fragmental detail partly in horizontal section and partly in top plan of the yieldable guide for the container.

Fig. 26 is a section on the line 26—26 of Fig. 1 looking in the direction of the arrows.

Fig. 27 is a section on the line 27—27 of Fig. 1 looking in the direction of the arrows.

Fig. 28 is a section on the line 28—28 of Fig. 27 looking in the direction of the arrows.

Fig. 29 is a section on the line 29—29 of Fig. 28 looking in the direction of the arrows.

Fig. 30 is a detail showing a face view of a detail for regulating the feed of labels.

Fig. 31 is a detail partly in side elevation and partly in longitudinal section showing the adjusting screw for adjusting the label guides.

Fig. 32 is a top plan partly in horizontal section of the label support or bed.

Fig. 33 is a side elevation of the bed or support shown in Fig. 32.

Figs. 34 and 35 are respectively side elevations and edge views of the tension or pressure rollers for the container conveying belt.

Fig. 36 is a detail showing a transverse section through the label guides with the label retainer knives shown in elevation.

Fig. 37 is a section on the line 37—37 of Fig. 36 looking in the direction of the arrows.

Fig. 38 is a fragmental detail showing a modified form of belt for applying the adhesive to the label; and Fig. 39 is a fragmental detail showing a still further modified form of endless member for applying the adhesive to the label, this member being formed as a coiled wire spring.

Figure 1:
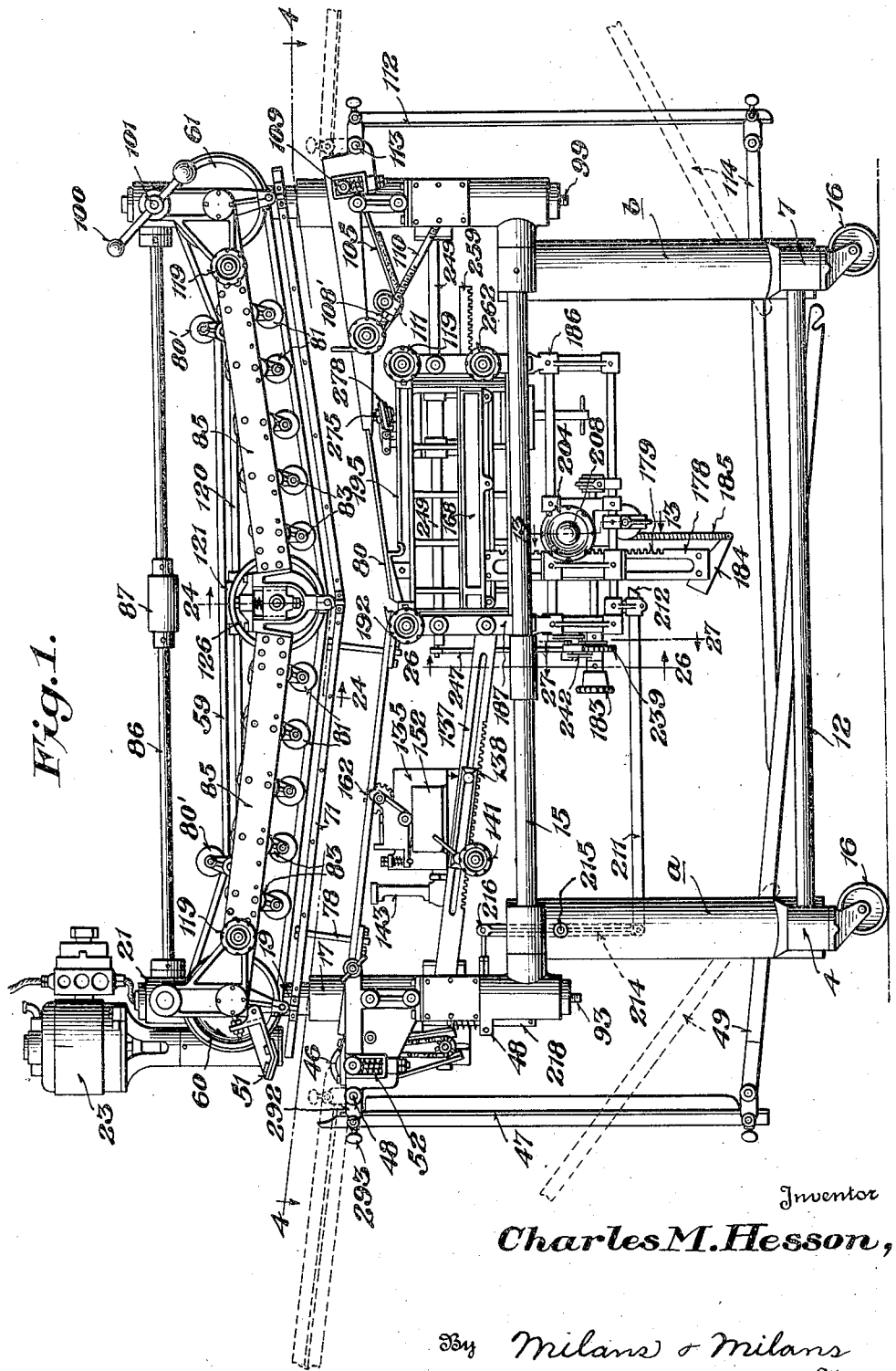
Fig. 1 is a side elevation looking at that side of the machine from which the operator works.

In the drawings $a$ and $b$ indicate supporting standards, the standard $a$ having at its upper end the outwardly directed arms 1 and 2 and at its lower end the outwardly directed arms 3 and 4, while the standard $b$ has at its upper end the outwardly directed arms 5 and 6 and at its lower end the outwardly directed arms 7 and 8. The standards are connected at the top by the rods 9 and 10 which extend through the arms 1, 6, 2 and 5, respectively and at the bottom by the rods 11 and 12 which pass through the arms 3, 8, 4 and 7 respectively the rods being held in adjusted positions by means of the set screws 13. As shown more particularly in Figs. 5 and 6 of the drawings the rods 9, 10, 11 and 12 are spaced inwardly of the outer ends of the arms and extending through the arms 1 and 6, adjacent their outer ends, is a horizontally extending rod 14 while extending through the arms 2 and 5, adjacent their outer ends is a horizontally extending rod 15. The standards $a$ and $b$ are supported by means of the casters or wheels 16 which are secured to the lower arms 3, 4, 7 and 8 of the standards, these casters or wheels permitting the machine to be readily moved from place to place when desired.

Supported on opposite ends of the rod or shaft 14 are the tubular standards 17 and 18 in the upper ends of which telescope the sleeves 19 and 20 to the upper ends of which are connected and supported the housings 21 and 22. An electric motor 23 is connected to the housing 21 and supported thereby, a worm gear 24 being secured to the lower end of the motor shaft 25 as shown more particularly in Fig. 2 of the drawings and meshing with the gear 26 in turn connected to the shaft 27 and to one end of which is secured a beveled gear 28 meshing with the beveled gear 29 as shown more particularly in Figs. 7 and 17 of the drawings, the beveled gear 29 being connected to the sleeve 30 to the lower end of which is connected a beveled gear 31 meshing with the beveled gears 32 and 33 as shown more particularly in Fig. 7 of the drawings, the beveled gear 32 being carried by and connected to the shaft 34 while the beveled gear 33 is connected to and carried by the shaft 35, this shaft 35 also having connected thereto the beveled gear 36 which meshes with a beveled gear 37. The shaft 34 is connected to a shaft 38 by means of the universal joint 39, the shaft 38 being used for a purpose to be later described. The beveled gear 37 is connected to the horizontally extending shaft 40, supported by the standard 17 and the standard 41 supported on one end of the rod or shaft 15 and connected to the shaft 40 is a sprocket wheel 42 which drives the chain 43 which in turn drives the sprocket wheel 44 carried by the shaft 45 on which is mounted and secured the roller 46 which is positioned, as shown more particularly in Fig. 3 of the drawings, adjacent the lower or inner end of the platform 47 pivotally connected to the machine at 48 so that it may be dropped into vertical or lowered position as shown in full lines in Fig. 1 of the drawings, the platform being supported in its normally raised or inclined position by means of the brace 49. The cans or containers denoted at 50 are fed to the platform 47 by hand or automatically and they roll downwardly over the platform until they contact with the stop 51 which retards their movement temporarily. The cans or receptacles when in engagement with the stop 51 are also in engagement with the roller 46 which operates in the direction indicated by the arrow more particularly in Fig. 1 of the drawings and the operation of this roller 46 which is yieldably supported, as shown more particularly at 52 in Figs. 1 and 3 of the drawings, rotates the cans or receptacles in the direction indicated by the arrows in Fig. 3 to feed the same by the stop 51 onto a plate 53 which is pivotally mounted at 54 and normally held in raised position by the sleeve 55 connected to the free end thereof, this sleeve having a nut 56 secured to its lower end and against which bears the upper end of a coiled spring 57, the lower end of the spring bearing against the stationary stop 58.

As the cans or receptacles are fed onto the plate 53 they will be engaged by the belts 59 which operate thereover around the pairs of pulleys 60 and 61, the pulleys 60 being slidably mounted in spaced relation on the shaft 62 and the pulleys 61 being slidably mounted in similarly spaced relation on the shaft 63. Depending from the shaft 62, and engaging the outer faces of the pulleys 60 are the brackets 64 having at their lower ends the outwardly directed pins 65 which engage and support the brackets 66 and 67, a stationary longitudinally extending guide bar 68 being connected to and supported by the bracket 66 while a yieldable guide bar 69 is connected to and supported by the bracket 67 this guide bar 69 having the square lugs or projections 70, as shown more particularly in Fig. 25 of the drawings which are received between the arms of a channel member 71. Secured to each of the lugs or projections 70 is a rod 72 which projects through openings in the vertical portion of the channel 71 and each of the rods 72 is surrounded by a spring 73 which normally tends to urge the bar 69 inwardly into close contact with one end of the cans or containers 50, as shown more particularly in Fig. 25 of the drawings. The opposite ends of the guide bars 68 and 69 are connected to and supported by the brackets 74 and 75 which are in turn supported by the outwardly directed pins 76 carried by the brackets 77 which depend from the shaft 63 and engage the outer faces of the pulleys 61, as shown more particularly in Fig. 5 of the drawings. Connected to and depending from the bar 68 and channel 71 of the guide bar 69, are the rods or bars 78 which extend through openings formed in the track 79, as shown more particularly in Fig. 24 of the drawings, the cans or containers 50 being fed upon these tracks from the plate 53 and operated thereover by the belts 59. As shown more particularly in Fig. 3 of the drawings the tracks extend downwardly towards the transverse center of the machine and at one end the guide bars 68 and 69 are similarly downwardly inclined whereas the opposite ends of the guide bars are upwardly inclined as also shown more particularly in Fig. 3 of the drawings. After the cans or containers leave the tracks 79 they will be fed onto the upwardly directed tracks 80, as also shown more particularly in Fig. 3 of the drawings. It will be understood that the horizontal guides 68 and 69 engage the ends of the cans or containers as shown more particularly in Fig. 24 of the drawings and as the cans or containers roll over the tracks they are guided in their movements.

As shown more particularly in Fig. 3 of the drawings the upper flights of the belts 59 are engaged by the wheels or rollers 80' whereas the lower flights of the belts will be engaged by the wheels or rollers 81 and urged downwardly into engagement with the belts by means of the coiled springs 82 shown more particularly in Fig. 34 of the drawings. The wheels or rollers 81 are carried by the links or loop members 83 which are elongated as shown to receive the guide pins 84 carried by the supporting members 85. As shown more particularly in Fig. 3 of the drawings the lower flights of the belts are inclined to extend parallel with the tracks 79 and 80 so that the belts will properly engage and feed the cans or containers over the tracks, the springs 82 permitting the wheels or rollers 81 to be raised under tension of the belts. The belts 59 are driven from the wheels or pulleys 60, which are slidably mounted on the shaft 62, the shaft 62 being connected to and operated by the motor driven gear 26, as shown more particularly in Fig. 17 of the drawings.

From the above description it will be seen that the belts, pulleys over which they operate, and guide bars 68 and 69, with the supporting means therefor, are carried by the housings 21 and 22 supported by the members 19 and 20 which telescope into the standards 17 and 18. Means must be provided to accommodate cans or containers of different diameters and it is for this reason that I have provided the members 19 and 20 which may be adjusted vertically within the standards 17 and 18. When these members 19 and 20 are vertically adjusted they carry with them the conveyor belts, the pulleys over which the belts operate, the shafts on which the pulleys are mounted, as well as the guide bars, and the members 19 and 20 may be so adjusted vertically that the belts 59 will engage the cans or containers of different diameters. In order to secure the vertical adjustment referred to I provide the horizontally extending rod 86, having intermediate its ends, a hand grip 87, a beveled gear 89 being connected to one end of the rod while a beveled gear 90 is secured to the opposite end of the rod, as shown more particularly in Fig. 2 of the drawings. The beveled gear 89 meshes with a beveled gear 91 secured adjacent the upper end of a vertically extending rod 92, the rod passing through the sleeve 30 and having its lower end threaded as shown at 93 for operation in a threaded opening of a nut 94 positioned in the lower end of the standard 17, as shown more particularly in Fig. 7 of the drawings. The upper end of the rod 92 is reduced as shown at 95 and received in the bearing 96 positioned in the upper end of the housing 21. The beveled gear 90 meshes with a beveled gear 97 secured to a vertically extending shaft or rod 98 of the same construction as the shaft or rod 92 just described, the lower end of this shaft 97 being threaded as shown at 99, more particularly in Fig. 2 of the drawings, and operable in a threaded bore of a nut similar to the nut 94. The rod 98 extends through the standard 18 and telescoping member 20. It will thus be seen that when the operator grasps the hand-hold 87 and rotates the rod 86 the gears 91 and 97 will be rotated to in turn rotate the rods 92 and 98. This rotation of the rods 92 and 98 operates the threaded ends 93 and 99 thereof, which are respectively right and left hand threads, through their respective nuts, threaded to match, to raise or lower, as desired, the telescoping members 19 and 20. For operating the rod 86 I provide the handle 100 connected to the transversely extending shaft 101. Secured to the opposite end of the shaft 101, to which the handle 100 is secured is a beveled gear 102 meshing with the gear 97. As the handle 100 is operated it will operate the shaft 101 and gear 102 to in turn operate the gear 97 meshing with the gear 90 secured to the shaft. By operating this handle 100 a micrometer adjustment may be secured, an indicating dial 103 being provided for this purpose, as shown more particularly in Fig. 16 of the drawings. As the belts 59 are operated in the direction indicated by the arrows in Fig. 3 the cans or containers 50 will be fed downwardly over the track 79 and upwardly over the tracks 80 onto a yieldable pad 104 for the purpose to be later described. From the pad 104 the cans or containers will be delivered onto the endless belt or member 105 having the yieldable surface 106, the ends of which will be spaced apart, as shown more particularly in Fig. 3 of the drawings and for a purpose which will be later brought out. This endless belt 105 operates around the rollers 107, 108 and 109 the roller 108 being adjusted by nut 108' on the screw 110, shown more particularly in Figs. 2 and 3 of the drawings, which operates through member 111 secured to one end of the roller, as shown more particularly in Fig. 2. The roller 109 is spring pressed as shown in Fig. 1, and thereby yieldable. From the endless belt 105 or pad 106, carried thereby the cans or containers to which the labels have been applied, in a manner to be later described will be delivered onto the platform 112 which is hingedly connected as shown at 113 and adapted to be normally supported in downwardly inclined position as shown in full lines in Figs. 2 and 3 of the drawings and in dotted lines in Fig. 1. When desired the platform may be lowered into vertically extending position as shown in full lines in Fig. 1. The platform will be held in normally raised position by means of the brace 114, the lower end of which is engageable with the standard or support b as shown more particularly in Fig. 3.

I have also provided means for adjusting the belts 59, associated pulleys 60 and 61, guides 68 and 69 and tracks 79 so that the same may be adapted for cans or containers of different heights or what might be termed different width when these cans or containers are in position for rolling over the tracks. Formed integral with the portions of the brackets 64 and 77, which engage the outer faces of the pulleys 60 and 61 are the inwardly directed arms 115 and 116, each of the arms being formed at its inner end with an interiorly threaded bearing portion, a transversely extending shaft 117 passing through and operable in the bearing portions of the arms 115 while a transversely extending shaft 118 extends through and is operable in the bearing portions of the arms 116. Each of these shafts is provided with right and left hand threads as shown more particularly in Fig. 9 of the drawings so that when the shafts are rotated by engaging the hand holds 119 the opposed pulleys and associated parts will be slid towards or away from one another so as to adjust the distance between the inner faces of the pulleys and so that the tracks will be positioned to properly receive the cans or containers of different heights and the belts 59 will be so positioned as to engage the cans or containers for conveying them over the tracks. At the same time the guides 68 and 69 are adjusted away from or towards one another so as to properly engage the ends of the containers or cans and guide the same over the tracks. When the hand holds 119 are grasped for operation the shafts 117 and 118 are rotated and operated independently and in order that these shafts may be operated in unison I provide the horizontally extending rod 120, having the hand grip 121, and provided adjacent opposite ends with the beveled gears 122 and 123, the beveled gear 122 engaging and meshing with the beveled gear 124 secured to the end of the shaft 117 while the beveled gear 123 engages and meshes with a beveled gear 125 connected to the end of the shaft 118. For engaging and properly spacing the flights of the belts 59, intermediate their ends, I provide the pulleys 126 and 127 which are mounted on the bushings 128, carried by the scaled shaft 129 and which bushings are slidably mounted in brackets 131 and 132 as shown more particularly in Fig. 24 of the drawings. The pulley 127 and bushing 128 is slidably and adjustably mounted on the shaft 129 and held in its adjusted positions by means of the screw 130. By providing the scale on the shaft 129 the pulley 127 may be properly adjusted relative to the pulley 126. The brackets 131 and 132 depend from the shaft 129 and each of these brackets has at its lower end an outwardly directed pin 133 supporting an arm 134 to which the guides 68 and 69 are connected.

It will be understood that the pulleys 126 and 127 are adjustable to properly position the belts, as shown more particularly in Fig. 24 of the drawings, to engage the cans or containers for rolling the same over the tracks 79. It will thus be seen that the pulleys and guides, with the conveying or driving belts 59 may be adjusted transversely of the machine for adapting the same for use with cans or containers of different heights and may also be adjusted vertically to adapt the mechanism for operation on cans of varying diameters.

Adhesive is applied to the cans or containers as they pass downwardly over the tracks 79 towards the center of the machine, the adhesive applied to the cans or containers being adapted for engaging and lifting a label from a stack in a manner to be later described. At 135 I have shown a receptacle for containing the adhesive 136 and this receptacle is mounted upon the tracks 137 provided along their lower edges with the teeth 138 adapted to be engaged by the gear wheels 139 carried by the transversely extending shaft 140, as shown more particularly in Fig. 12 of the drawings, this shaft being adapted for rotation by means of the hand grip 141. As the shaft 140 is rotated the gears 139 engaging the teeth 138 of the tracks 137 will feed the receptacle 135 longitudinally of the tracks. A heating unit is shown at 142 for keeping the adhesive in a liquid state and at 143 I have shown a thermometer, while a regulator is shown generally at 144. Vertically spaced shafts 145 and 146 are mounted in the receptacle, a gear wheel 147 being secured to the end of the shaft 146 and meshing with the gear wheel 148 connected to the inner end of the shaft 149 which has the gear 150 secured to its outer end to be driven by a worm gear 151 connected to the drive shaft 38. Adhesive is introduced into the receptacle 135 through the conduit 152. Connected to the shaft 145 is the member 153 having the longitudinally extending teeth, the end portions 154 of the teeth being of greater height than the intermediate portions thereof so as to mesh with longitudinally extending teeth formed on the member 155 connected to and carried by the shaft 146. The intermediate portion of the longitudinally extending teeth on the member 153 are of sufficient height to engage the teeth on the member 155 but do not intermesh therewith and the member 153 is rotated by the member 155 through the intermeshing of the end portions 154 with the teeth of the member 155. Loosely mounted on the ends of the shaft 146 are the arms 156 which support the transversely extending shaft 157, these arms 156 being provided with the extensions 158, as shown more particularly in Fig. 14 of the drawings, the extensions 158 being engaged by the coiled springs 159 surrounding the rod 160 having its lower end portion extending through the extensions to limit the downward movement thereof, the rods 160 being adjustable by means of the nuts 161. Connected to the shaft 157, intermediate the ends thereof, are the gear wheels 162 which mesh with the teeth of the member 155 and slidably mounted on the rod or shaft 157 are the sleeves 163, each of the sleeves being formed at one end with the flange portion 164 and at its opposite end with a toothed flange 165 which mesh with and are driven by the toothed member 155. The flanges 164 extend into longitudinally extending openings 166 formed in the tracks 79 and as the tracks are adjusted transversely, in the manner previously described, the sleeves 163 and toothed flanges 165 thereof will be adjusted longitudinally of the shaft 157 so that each of the toothed flanges 165 as well as the gears 162 will contact with the cans or containers for applying spots of adhesive thereto. As the shaft 146 is operated it will rotate the member 155 which in turn will operate the member 153 and the gears 162 and toothed flanges 165. Adhesive will be taken up from the receptacle by the members 153 and 155 and applied by the member 155 to the gears 162 and toothed flanges 165 which in turn apply, as previously described, spots of the adhesive to the cans or containers.

A stack of labels indicated at 167 is supported upon the longitudinally extending transversely spaced bars 168, 169 and 170 and extending through the bar 169, intermediate the ends thereof, is a rod 171 secured in position by means of the screw 172. The ends of the rod 171 extend through depending lugs 173 formed on the lower edges of the bars 168 and 170 and adapt the bars 168 and 170 to be slid transversely of the rod for adjustment relative to different size labels. Leaf springs 174 are secured to the middle bar 169, as shown more particularly in Fig. 32 of the drawings with their ends engaging the inner faces of the bars 168 and 170 to normally urge these bars towards the ends of the rod 171, the outward movement of the bars being limited by the cotter pins 175. A rod 176 is secured to the middle bar 169, adjacent each end thereof, by means of a set screw 177 and the ends of the bars 168 and 170 are supported by the rods 176 and adapted for sliding movement thereover. Depending from the bar 169 is an arm 178 provided on one edge with the teeth 179 adapted to be engaged by a gear wheel 180, the gear wheel 180 being operated through the worm gear 181 and gear 181', the worm gear 181 being connected to and carried by a rod 182 to which is secured a knob 183 adapted to be engaged by the operator for rotating the shaft, to secure a minute or close adjustment of the labels in a manner to be later described. A trip plate 184 is secured to the lower end of the arm or rack 178, for a purpose to be later described, and connected to one end of this trip plate 184 is a coiled spring 185, the opposite end of the coiled spring being secured to the bar 186 as shown more particularly in Fig. 3 of the drawings. The coiled spring 185 normally tends to feed the arm or rack 178 upwardly and in turn to raise the bars 168, 169 and 170, so as to properly position the stack of labels 167 in such a position that the uppermost label may be withdrawn as the can or receptacle passes thereover, the spots of adhesive previously applied to the can or container engaging the end of the label at the point marked A and withdrawing the uppermost label from the stack as the can passes upwardly over the tracks 80, as shown more particularly in Fig. 3. As the can or container rolls upwardly over the tracks 80 the label is wrapped around the same and is pressed into tight engagement by the pad 104 before the container or can passes onto the endless belt 105. The surface of the endless belt over which the cans or containers pass is of such a length that the can or container with the label thereon will make one complete revolution thereon before being discharged onto the platform 112. If the label is of relatively small diameter the endless belt will be so adjusted that the end of the pad or surface 106 will be so positioned that the can as it rotates thereover will only make one complete revolution before the end of the pad or surface is reached. In other words it is desirable that the can or container pass from the pad or surface 106 just as the lapped ends of the labels reach the end thereof to prevent looseness of the label. It is not desirable that a partial rotation of the can or container take place on the surface 106 of the endless belt and it is for this reason that a space is left between the ends of the surface 106, as shown more particularly in Fig. 3 of the drawings.

Positioned adjacent opposite ends of the bars 168, 169 and 170 are the frame members 187 and carried by each of these frame members, for both rotatable and slidable movement, is a rod 188 having the spaced right and left hand threads 189 and 190, as shown more particularly in Fig. 31 of the drawings with one end of the rod reduced, as shown at 191, with a knob 192 secured thereto and adapted to be grasped by the operator. Fitting over the reduced extension 191 is the threaded sleeve 193 having at one end the knob 194. Carried by the rods 188 are the depending members 195, formed with spaced arms, which extend parallel with the outer faces of the bars 168 and 170, as shown more particularly in Fig. 20 of the drawings and adapted to engage the edges of the stack of labels. These depending members 195 are pivotally connected at 195a, as shown more particularly in Fig. 10, to the interiorly threaded sleeves 196 operable on the threads of the rods 188 and when the knobs 192 are grasped the rods 188 may be rotated in either direction and according to the direction of movement the depending members 195 will be moved towards or away from one another to adapt the depending members for properly engaging the edges of labels, in the stack, of different sizes. If it is desired to move the depending members 195, in unison, in the same direction the knob 194 will be grasped to rotate the sleeve 193 in the interiorly threaded lug 197 and this movement will slide the rods 188 with the depending members thereon. By this arrangement, the depending members may be moved in unison in any direction for properly positioning the depending members relative to the cans as well as the stack of labels. The upper edges of the depending members 195 are provided with the longitudinally extending slots 198, for a purpose which will be later described, and the lower edges of the tracks 80 are secured to the portions 195' of the upper edges of the depending members 195 by means of rivets or other suitable fastenings and it will be understood that the tracks will be adjusted with the depending members so as to properly receive cans or containers of different widths, the tracks 80 being spaced the same distance apart as the tracks 79. By pivotally connecting the members 195 at 195a said members may be swung at an angle to in turn swing the stack of labels at an angle relative to the cans so as to at all times place the labels straight on the cans. This is necessary should the labels be cut crooked as is sometimes the case.

As shown more particularly in Fig. 13 of the drawings the gear wheel 180, previously described, is connected to or mounted on a sleeve 199 through which extends a rod 200 on which is mounted a sleeve 201 to which the gear 181' is keyed. The end of the sleeve 201 is provided with teeth 202 cooperating with teeth on a member 203 secured to the end of the shaft 200 to form a clutch. A hand wheel 204 having the sleeve portion 205 surrounds the sleeve 199 and is provided interiorly with a depending lug or projection 206 having its lower end received in a longitudinally extending slot or recess 207 in the rod 200, a knob 208 being formed on or secured to the rod with a coiled spring 209 positioned between the end of the sleeve 199 and shoulder 210 so as to normally hold the rod in the position shown in Fig. 13. When the rod 200 is pushed inwardly, against the action of the coiled spring 209, it releases the clutch at the end of the shaft or rod and permits the gear 180 to be operated independently of the gear 181' and the worm 181. This is of particular advantage when the labels in the stack are to be replenished so that the arm or bracket 178 may be quickly drawn downwardly to lower the bars 168, 169 and 170, without operating the worm 181 and the cooperating gear 181'. The releasing of this clutch also permits the bracket or rack 179 to be quickly raised to bring the uppermost label of the stack in position to be engaged by the can or container passing thereover and a more minute or closer adjustment may be secured through the rod 182 and knob 183.

It will be appreciated that as the supported bars for the stack of labels approach that position where it is necessary to replenish the labels in the stack it is necessary to temporarily stop the movement of the cans or containers over the tracks and for this purpose I provide the bar 211 having its inner end beveled as shown at 212 and adapted to be engaged by the trip plate 184. The outer end of the bar 211 is pivotally connected at 213 to the lower end of the lever 214 pivotally mounted at 215 and pivotally connected at 216 to the upper end of the lever is the latch 217 which is adapted to be normally received in a notch formed in the rod 218 which passes through the sleeve 55 and an opening formed in the plate 53. The rod 218 is normally urged towards raised position by means of the coiled spring 219 which engages a plate or washer 220 thereon, but when the latch 217 is engaged in the notch of the rod the upper end of the rod will be held in a position flush with the surface of the plate 53, as shown more particularly in Fig. 3 of the drawings, and with the coiled spring 219 under tension. When the trip plate 184 engages the beveled end 212 of the bar 211 it will slide the bar to the left of the position shown in Fig. 3 to draw the upper end of the lever 214 inwardly and to release the latch 217 from the notch in the bar 218. The coiled spring 219 then forces the rod 218 upwardly to position the upper end of the rod above the upper surface of the plate 53 and in a position to engage and stop the movement of the cans or containers. After the labels have been replenished in the stack then the rod 218 will be grasped and drawn downwardly so that the latch 217 will again engage in the notch of the rod and hold the upper end of the rod in its normal position to permit movement of the cans or containers over the plate 53 and onto the tracks 79. The upper bars of the adjustable depending members or label guides 195 are provided on their inner faces, adjacent their inner ends, with a vertically extending recess 221 communicating with an enlarged recess 222 in which is adjustably received a pin 223 held in its adjusted position by means of a screw 224 or other suitable fastening. Each of the pins 223 is provided, adjacent its upper end, with an outwardly projecting knife or lug 225, these knives or lugs projecting through the opening 221 and overlying the stack of labels for properly holding them to be engaged by the cans or containers. This arrangement is more particularly illustrated in Figs. 36 and 37 of the drawings.

In order to automatically feed the stack of labels upwardly for proper engagement with the cans or containers I provide a trip finger 226 pivotally mounted at 227, the upper end of the finger being normally held in raised position by means of the spring 228 to be engaged by the cans or containers as they pass from the track 79 to engage the ends of a label and then to pass upwardly over the tracks 80. Operating in a guide beneath the upper end of the trip finger 226 is a vertically extending rod 229 with its upper end normally positioned a short distance below the end of the trip finger. When the labels are properly positioned the end of the trip finger will only be depressed by the cans or containers passing thereover a short distance as the end of the trip finger will engage the labels of the stack but when the upper labels of the stack are positioned such a distance below the end of the trip finger that they would not be engaged by a can or container then the end of the trip finger will be depressed a sufficient distance to engage the end of the rod 229 and depress or lower the same. The lower end of the rod 229 is connected at 230 to a lever 231 the end of which passes through the arm 232 of a bell crank lever, as shown more particularly in Fig. 26 of the drawings the other arm 233 of the bell crank lever being connected to a pin 234 carried by a ring-like member 235 having an extension 236 provided in one face with a recess 237. The ring-like member 235 surrounds a sleeve 238 mounted on and secured to the shaft 182, and a ratchet wheel 239 is formed on one end of the sleeve and its inner face engaging with the ring-like member 235 and held in frictional engagement therewith by means of a leaf spring 240 positioned in the recess 237 of the extension 236. As shown more particularly in Fig. 28 of the drawings the upper arcuate edge of the extension 236 extends flush with the outer edges of the teeth of the ratchet wheel 239 for a purpose which will be presently apparent. Mounted on the shaft 182, adjacent the outer face of the ratchet wheel 239, is a sleeve 241 having the arm 242 to which is pivotally connected at 243 a pawl 244 normally pressed downwardly by means of the spring 245. Pivotally connected to the arm 242 at 246 is one end of a rod 247, the opposite end of the rod being connected to the eccentrically positioned pin 248 on the end of a horizontally extending rod 249 as shown more particularly in Fig. 3 of the drawings and driven from the beveled gear 250 carried by the shaft 98. Pivotally connected at 251 is a pawl 252 having the extension 253 forming a hand hold or handle, this pawl 252 normally engages the ratchet wheel 239 to prevent reverse movement thereof and the extension 253 is connected to the arm 254 through means of the rods 255 and 256 connected by the turn buckle 257.

As previously stated, when the stack of labels is properly positioned to be engaged to be removed by the cans or other containers the movement of the cans or containers over the trip finger 226 will lower the upper end of the trip finger but not a sufficient distance to engage the upper end of the rod 229, it being understood that the trip finger will be limited in its downward movement by engagement with the stack of labels. However, when the stack is not properly positioned or raised so that the movement of the trip finger will be limited by engagement with the labels, then the trip finger will engage the upper end of the rod 229 and lower the same. The lowering of the rod will operate the lever 231 which in turn being connected to the arm 232 of the bell crank lever will raise this arm and throw the arm 233 in the direction indicated by the arrow in Fig. 26 and swing the extension 236 of the ring-like member 235 so that the pawl 244 may drop into engagement with the teeth of the ratchet wheel 239, the pawl normally riding on the arcuate edge of the extension 236 without engaging the teeth of the ratchet wheel. The arm 242 is continuously swinging, with the pawl 244 by the rod 247 connected to the continuously rotated shaft 249, and when the extension 236 is so swung that the pawl can drop into engagement with the teeth of the ratchet wheel it will rotate the ratchet wheel and shaft 182 to which it is connected to operate the worm gear 181 meshing with the gear 181' to in turn operate the gear 180 and raise the rack 178 with the stack of labels supported by the bars, one of which is connected to the rack. As the ratchet wheel 239 is rotated it will feed the extension 236 of the ring-like member 235 back to its original position because of the frictional engagement of the spring 240 with the face of the ratchet wheel and when fed into its original position it will again raise the pawl 244 and permit operation of the pawl without engaging the teeth of the ratchet wheel.

I further provide means for applying a line of adhesive transversely of the labels to form a seal at the overlapped edges thereof and for this purpose a receptacle or chamber 258 is adjustably mounted on the longitudinally extending rod 14, a rack 259 being secured to the receptacle and adapted to be engaged by the gear wheel 260 carried by the shaft 261 which is rotatably mounted in one of the end frames 187, as shown more particularly in Figs. 1, 2, 3 and 20 of the drawings, a knob 262 being secured to that end of the shaft 261 opposite to the end to which the gear wheel 260 is connected. When the knob 262 is engaged the shaft 261 may be rotated and through means of the gear 260 meshing with the rack 259 connected to the receptacle 258 the receptacle may be slid or adjusted on the rod 14. As shown more particularly in Fig. 20 of the drawings the receptacle is secured on the rod 14 by means of the clamp plate 263 secured to the casting 264 by means of the screws 265 or other suitable fastening. Extending into the receptacle 258, and mounted for rotatable movement, is the shaft 266 to the inner end of which is secured a pulley 267. Also secured to the shaft 266 is a beveled gear 268 which meshes with the beveled gear 269 on the shaft 270, a gear wheel 271 being secured to the end of the shaft and meshing with a gear wheel 272 mounted on the shaft 249 which is driven, as previously described, by the beveled gear 250. A standard 273 is formed on the receptacle 258 and has a bearing portion 274 in which the end of a rod 275 is adapted to be secured as shown more particularly in Fig. 20 of the drawings. A pulley 275 is mounted in the opposite end of the rod and pulleys 276 and 277 are carried by an arm 278 formed as a part of the standard 273. A belt 279 operates around the pulleys 267, 276, 275 and 277 and this belt extends down into the adhesive 280 carried by the receptacle 258, as shown more particularly in Fig. 20 of the drawings. It will be noted that the arrangement of the pulleys provides for the belt 278 to have the two horizontally extending flights, one on a slightly higher plane than the other, and that horizontal flight on the lower plane being adapted to contact with the uppermost label of the stack to apply a line of adhesive thereto, as shown more particularly in Fig. 20. In the preferred form of the invention I have shown the belt as being round, but it may be square in cross section as shown more particularly at 281 in Fig. 38 of the drawings, or it may be of a coil spring formation as shown at 281' in Fig. 39. As the coil spring formation is operated around the pulley 267 the coils will open to receive the adhesive. The lower flight of the belt will operate through a guide of the construction shown more particularly in Fig. 21 of the drawings, this guide including the channel portion 282 and the arm or bar 283, the channel portion having its lower surface downwardly and outwardly beveled as shown at 284 in Figs. 20 and 22 of the drawings. The guide is adjustably mounted on the upper edges of the adjustable downwardly extending members or label guides 195, by means of the bearing members 285 which have the downwardly projecting ribs 286 received in the elongated openings 198. Carried by arms 286 secured to the bearing members 285 is a transversely extending bar 287 having the lower edge serrated, as shown at 288, this serrated edge engaging the upper surface of the stack of labels as shown more particularly in Fig. 23 of the drawings. Spring members 288' extend over the belt 278 as the same passes through the channel portion 282 of the guide and parallel with the arm or bar 283 thereof, these spring members normally holding the channel in proper position for engagement with the upper surface of the uppermost label for applying the line of adhesive thereto. The bottom of the channel portion 282 is provided with the longitudinally extending recess 289 so that the adhesive carried by the belt will not be scraped from the belt prior to engagement for application to the label. As shown the bar 275 passes through openings formed in the upwardly extending portions 290 of the bearings 285.

As shown more particularly in Fig. 11 of the drawings longitudinally extending guide bars 290 are carried by the platform 47 over which the cans or containers are fed to the machine and these guide bars are adjustable through means of the rods 291 extending outwardly therefrom and through openings in the sides 292 of the platform, the rods being held in their adjusted positions by means of the thumb screws 293 or other suitable fastenings.

From the above detailed description it is thought that the construction and operation of my machine will be clearly understood and I wish to call particular attention to the fact that the parts are arranged and supported in such a manner that one side of the machine is open so that the operator may have sufficient space or room for operating and access may be gained to the several parts. The cans or containers are fed to the machine over the platform 47 and the movement is temporarily retarded by means of the stop or abutment 51, the roller 46 operating in the direction indicated by the arrows and force the cans or containers pass the stop or abutment 51 and onto the plate 53 at which point they are engaged by the belt 59 and carried over the tracks 79 and 80 as well as the pad 104 and endless belt or pad 106 for deposit onto the discharge platform 112. As the cans or containers are engaged by the belts 59, movement is speeded so as to properly convey them in spaced relation relative to the cans or containers being fed over the platform. As the cans or containers pass downwardly over the track 79 spots of adhesive are applied thereto by the wheels 162 and 165 and these spots of adhesive engage the uppermost label of the stack at the point indicated by $a$ in Fig. 3 and withdraw the label from the stack as indicated by dotted lines in Fig. 3 as the can or container passes upwardly over the tracks 80 and onto the pressing pad 104. A transverse line of adhesive is applied to the uppermost label by means of the lower flight of the belt 278 so that as the ends of the labels are wrapped they will be connected or sealed together. As stated, in the detailed description it is desirable that the cans or containers leave the endless belt 105 at a point where the can or container has made a complete revolution for pressing the label thereon and at a point where the overlapped ends have been pressed together. With the diameter of the can or container shown in the drawings the endless belt 105 with its pad 106 may be positioned as shown and as the can rolls over the endless belt and pad the wrapped end will engage therewith at a point where the can or container leaves the endless belt or pad for discharge onto the platform 112. If a can or container of less diameter is being operated upon the endless belt will be adjusted so that the end of the pad will be properly positioned from the end of the platform 112 so that the overlapped ends of the label will engage with the end of the pad and then when the can or container reaches the end of the pad there is no further pressing of the label thereon due to the fact that the ends of the pad are spaced apart. If a partial revolution of the can or container is made after the overlapped ends are pressed together there would be a tendency to unwind the label which is undesirable.

I also lay particular stress on the novel manner in which I support the stack of labels as well as the manner in which the label support is automatically raised upwardly when the labels become low, this automatic raising means including the trip finger 226 engaged by the can or container and depressed into engagement with the vertically extending rod 229 which through suitable mechanism operates the shaft 182 having the worm 181. A pawl 244 is continuously operated but does not operate the ratchet wheel 239 unless the stack of labels is so positioned that it is necessary to automatically raise the same. In other words the pawl 244 is normally held out of engagement with its ratchet wheel 239 until the upper surface of the stack of labels reaches a point to permit the trip finger 226 to be lowered to such an extent as to engage the rod 229. The depending label guides 195 permit adjustment for labels of various sizes and at the same time I have provided means, previously described in some detail for adapting the mechanism for use on cans or containers of various diameters or of various lengths. I also have provided the means for stopping the movement of the cans or containers while the stack of labels is being replenished.

Having fully described my invention what I claim as new and desire to secure by Letters Patent is:—

1. A machine of the character described for applying labels to containers including means for supporting a stack of labels, means for conveying a container over the stack and removing the uppermost label therefrom, and a member positioned and adapted to receive the container and to press the label into tight engagement therewith, said member being formed with an end portion over which the container passes to release pressure after the container has made a complete revolution upon the member.

2. A machine of the character described for applying labels to containers including means for supporting a stack of labels, means for conveying a container over the stack and removing the uppermost label therefrom, and a member positioned and adapted to receive the container for pressing the label into tight engagement therewith, said member having an end portion adjustable to permit relief of the pressure after the container has made a complete revolution upon the member.

3. A machine of the character described for applying labels to containers including means for supporting a stack of labels, means for conveying a container over the stack and removing the uppermost label therefrom, an endless member adapted and positioned to receive the container and to press the label into tight engagement therewith, said endless member having a surface portion with spaced ends, and means for adjusting the endless member to position the ends of the surface portion to permit the container to pass beyond the end of the surface portion after the container has made a complete revolution upon the surface portion.

4. A machine of the character described for applying labels to containers including means for supporting a stack of labels, means for conveying a container over the stack and removing the uppermost label therefrom, and means in the path of movement of the container and operable thereby to raise the stack of labels, operable movement of said means being controlled by the height of the stack of labels relative thereof.

5. A machine of the character described for applying labels to containers including means for supporting a stack of labels, means for conveying a container over the stack and removing the uppermost label therefrom, and a trip finger in the path of movement of the container and operable thereby for raising the stack of labels, operable movement of the trip finger being controlled by the height of the stack of labels.

6. A machine of the character described for applying labels to containers including means for supporting a stack of labels, means for conveying a container over the stack and removing the uppermost label therefrom, a member in the path of movement of the container and operable thereby, the movement of said member being normally limited by engagement with the labels of the stack, and means controlled by said member, when the stack of labels has reached a predetermined level, for raising the stack.

7. A machine of the character described for applying labels to containers including means for feeding the containers, means for supporting a stack of labels, means for conveying containers over the stack and removing the uppermost label therefrom, and means operable by the movement of the label support for stopping the feed of containers when the stack of labels is to be replenished.

8. A machine of the character described for applying labels to containers including means for feeding containers, means for supporting a stack of labels, means for forcing the stack upwardly, means for conveying containers over the stack and removing the uppermost label therefrom, and means controlled by the upward movement of the label support for stopping the feed of the containers when the stack of labels is to be replenished.

9. A machine of the character described for applying labels to containers including means for feeding the containers, means for supporting a stack of labels, means for feeding the stack of labels upwardly, means for conveying containers over the stack and removing the uppermost label therefrom, a rod normally positioned to permit feed of the containers thereby, and means operable when the feeding means for the stack of labels has reached a predetermined point to release the rod to stop the feed of the containers.

10. A machine of the character described for applying labels to containers including means for supporting a stack of labels, members adapted to engage the edges of the labels in the stack, means for adjusting said members towards or away from one another or in unison in the same direction, and means for conveying the containers over the stack and removing the uppermost label therefrom.

11. A machine of the character described for applying labels to containers including means for supporting a stack of labels, depending arms adapted for engaging the edges of the labels in the stack, means for adjusting the arms towards or away from the stack or in unison in either direction, and means for conveying the containers over the stack and removing the uppermost label therefrom.

12. A machine of the character described for applying labels to containers including means for supporting a stack of labels, means for conveying the containers over the stack and removing the uppermost label therefrom, and means for adjusting the width of the conveying means to adapt the same for containers of different heights.

13. A machine of the character described for applying labels to containers including means for supporting a stack of labels, means for conveying containers over the stack and removing the uppermost label therefrom, and means for adjusting the conveying means vertically and as to width for adapting the same to containers of different diameters and heights.

14. A machine of the character described for applying labels to containers including means for supporting a stack of labels, a pair of endless members engageable with the containers for conveying the same over the stack of labels and removing the uppermost label therefrom, and means for adjusting the endless members one relative to the other for adapting the same for containers of different heights.

15. A machine of the character described for applying labels to containers including means for supporting a stack of labels, a pair of endless members adapted to be engaged with the containers for conveying the same over the stack of labels and removing the uppermost label therefrom, means for adjusting the endless members vertically to adapt the same to containers of different diameters, and means for adjusting the endless members one relative to the other to adapt the same for containers of different heights.

16. A machine of the character described for applying labels to containers including means for supporting a stack of labels, tracks, means for conveying the containers over the tracks and stack of labels, and means for adjusting the tracks to adapt the same to containers of different heights.

17. A machine of the character described for applying labels to containers including means for supporting a stack of labels, tracks, a pair of endless members adapted to engage the containers and convey the same over the tracks and stack of labels, means for adjusting the endless members one relative to the other to adapt the same to containers of different heights, and means for adjusting the tracks to adapt the same to containers of different heights.

18. A machine of the character described for applying labels to containers including means for supporting a stack of labels, transversely spaced tracks, transversely spaced endless members adapted to be engaged with the containers for conveying the same over the tracks and stack of labels, and means for simultaneously adjusting the endless members one relative to the other and the tracks one relative to the other to adapt the same for containers of different heights.

19. A machine of the character described for applying labels to containers including means for supporting a stack of labels, transversely spaced tracks, transversely spaced endless members adapted for engaging the containers and to convey the same over the tracks and stack of labels, means for adjusting the endless members vertically to adapt the same to containers of different diameters, and means for adjusting the endless members one relative to the other to adapt the same to containers of different heights.

20. A machine of the character described for applying labels to containers including means for supporting a stack of labels, transversely spaced tracks, a pair of endless members transversely spaced, means for adjusting the endless members vertically for adapting the same to containers of different diameters, and means for simultaneously adjusting the transversely spaced endless members one relative to the other and the transversely spaced tracks one relative to the other to adapt the same to containers of different heights.

21. A machine of the character described adapted for applying labels to containers including means for supporting a stack of labels, tracks, means for conveying the containers over the tracks and stack of labels, and guide members positioned relative to the tracks and adapted to engage the ends of the containers, one of said guide members including a channel portion having a vertical wall and vertically spaced horizontal portions, a bar having projections extending through the vertical wall of the channel member and enlarged portions engageable with and operable between the horizontal portions of the channel, and springs surrounding the projections between the enlarged portions thereof and the vertical wall of the channel.

22. A machine of the character described for applying labels to containers including means for supporting a stack of labels, means for conveying containers over the stack and removing the uppermost label therefrom, and means overlying the stack for positioning the labels relative to the containers.

23. A machine of the character described for applying labels to containers including means for supporting a stack of labels, means for conveying containers over the stack and removing the uppermost label therefrom, and adjustable knives overlying the edges of the stack for positioning the same relative to the containers.

24. A machine of the character described adapted for applying labels to containers including means for supporting a stack of labels, tracks, means for conveying the containers over the tracks and stack of labels, guide members positioned relative to the tracks and adapted to engage the ends of the containers, and means for simultaneously adjusting the conveying means and guide members.

25. A machine of the character described adapted for applying labels to containers including means for supporting a stack of labels, tracks, means for conveying the containers over the tracks and stack of labels, guide members positioned relative to the tracks and adapted to engage the ends of the containers, and means for simultaneously vertically adjusting the conveying means and guide members relative to the tracks.

26. A machine of the character described adapted for applying labels to containers including means for supporting a stack of labels, tracks, means for conveying the containers over the tracks and stack of labels, guide members positioned relative to the tracks and adapted to engage the ends of the containers, and means for simultaneously adjusting the conveying means, the guide members, and the tracks.

27. A machine of the character described adapted for applying labels to containers including means for supporting a stack of labels, tracks, means for conveying the containers over the tracks and stack of labels, guide members positioned relative to the tracks and adapted to engage the ends of the containers, means for applying adhesive to the containers, and means for simultaneously adjusting the conveying means, the tracks, the guide members, and adhesive applying means.

28. A machine of the character described for applying labels to containers including means for feeding the containers, means for supporting a stack of labels, means for feeding the stack of labels upwardly, means for conveying containers over the stack and removing the uppermost label therefrom, a stop, means for normally holding the stop in position to permit feed of the containers thereby, means carried by the label support for releasing the means which normally holds the stop, and means for raising the stop into the path of movement of the containers.

29. A machine of the character described for applying labels to containers, including means for supporting a stack of labels, and means for conveying a container over the stack and removing the uppermost label therefrom, said label supporting means including a fixed center bar and movable bars positioned on opposite sides thereof.

30. A machine of the character described for applying labels to containers, including means for supporting a stack of labels, and means for conveying a container over the stack and removing the uppermost label therefrom, said label supporting means including a fixed center bar and movable bars positioned on opposite sides thereof, and means for normally urging the movable bars away from the central bar.

31. A machine of the character described for applying labels to containers including means for supporting a stack of labels, means for conveying the container over the stack and removing the uppermost label therefrom, and means for automatically raising the stack of labels, said means including a ratchet wheel, a pawl, means for continuously operating the pawl, a member normally engageable by the pawl to prevent engagement thereof with the ratchet wheel, and means controlled by the height of the stack of labels for positioning the member to permit engagement of the pawl with the ratchet wheel.

32. A machine of the character described for applying labels to containers including means for supporting a stack of labels, means for conveying the container over the stack and removing the uppermost label therefrom, and means for automatically raising the stack of labels, said means including a ratchet wheel, a pawl, means for continuously operating the pawl, a member having a portion extending flush with the outer edges of the teeth of the ratchet wheel to hold the pawl normally out of engagement with the ratchet wheel, and means controlled by the height of the stack of labels for positioning the member to permit engagement of the pawl with the ratchet wheel.

CHARLES M. HESSON.